455-605 AU 233 EX
FIP8106 XR 3,534,181

[redacted]

Oct. 13, 1970 H. ZIMMERMANN 3,534,181

PIVOTAL TONE ARM WITH BEAM PICKUP

Filed May 6, 1968

INVENTOR 3,534,181
PIVOTAL TONE ARM WITH LIGHT BEAM PICKUP

Heinrich Zimmermann, Schwarzwald, Germany, assignor to Dual Gebruder Steindinger, Schwarzwald, Germany, a corporation of Germany Filed May 6, 1968, Ser. No. 726,814
Claims priority, application Germany, May 6, 1967, D 53,015
Int. Cl. G11b *3/10*; H04r *5/00, 23/00*
U.S. Cl. 179—100.4 4 Claims

ABSTRACT OF THE DISCLOSURE

A pickup for scanning of tone grooves cut in two modulation directions disposed at a right angle relative comprising a tubular scanning member, which includes a scanning needle disposed at one end, and an elastic bearing connecting the scanning member with the pickup. A mirror is secured to the scanning member which mirror has two straight edges disposed corresponding to the two modulation directions, and a light source and two light sensitive cells are arranged spaced from the mirror with light guides disposed, such that the light beam reflected from the mirror crosses the light sensitive faces of the cell.

The present invention relates to a pickup controlling a light beam and having mounted on the pickup a scanning member disposed at an acute angle to the scanning plane, which scanning member carries at its end a scanning needle to which a mirror is attached.

It is known to provide a mirror on the scanning member of a pickup, where the mirror is rotatably mounted about an axis, and the scanning member is radially arranged relative to this rotary axis.

It is one object of the present invention to provide a light beam pickup which renders possible an improved scanning of a two-component recording.

It is another object of the present invention to provide a light beam pickup, wherein the scanning member is mounted for rotation in all directions on the pickup, wherein further the mirror- or cross-section area of the incoming light beam is designed such, that the cross-sectional area of the light beam reflected therefrom has two edges, which are disposed cross-wise to the two modulation directions of the record groove to be scanned, which edges are preferably disposed at a right angle toward each other and which cross the cross-sectional area of a light guide or a light sensing cell disposed in the path of the reflected light beam. The pickup is arranged on a tone arm disposed on a mounting plate for the purpose of guiding the scanning movement pivotably about a vertical and a horizontal axis. In this development of the present invention the light source required therefor is immovably disposed on the mounting plate away from the tone arm and its head, and the light beam is guided to the pickup by means of a light guide at least partly within the tone arm.

In accordance with the arrangement of the present invention, it is possible to lead a light beam to the pickup, without requiring a mechanical connection of the mounting plate to the parts participating in the movement of the pickup.

A further development of the present invention resides in the fact, that the reflected part of the light beam is closely guided by means of its light guide to the vertical axis of the tone arm and to a light sensitive cell disposed immovably on the mounting plate and with its surface arranged in a rotation plane to the vertical tone arm axis.

In accordance with this arrangement, it is possible, to provide a tone arm which tracks completely free, that is, without any mechanical obstacles to the scanning movement with the exception of its bearing friction.

In a case in which the light path due to the constructive arrangement of the tone arm and its mounting is required to be guided along a longer length perpendicularly to the longitudinal axis of the tone arm the present invention provides, in a further development, that the light guides are interrupted close to the horizontal swinging axis of the tone arm and form an air gap. The position of the air gap towards the horizontal axis is chosen such, that the separating faces of the light guides vary at a minimum within the changing range of the horizontal scanning positions.

With these and other objects in view, which will become apparent in the following detailed description, the present invention will be clearly understood in connection with the accompanying drawing, in which.

Figure 3:
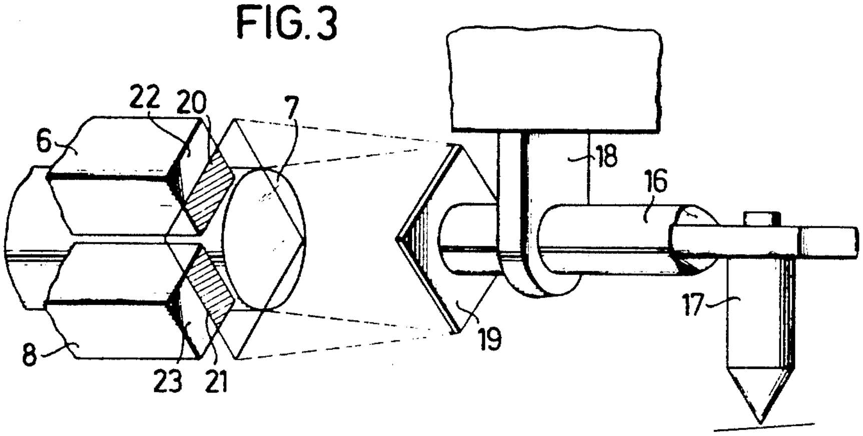
FIG. 3 is a perspective view of the essential parts of the light beam controlling scanning device of a pickup.
Figure 1:
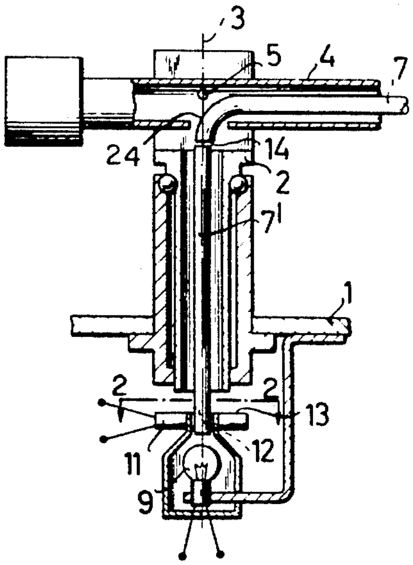
FIG. 1 is an axial section of a part of a tone arm with its bearing member on the mounting plate of the record player.
Figure 2:
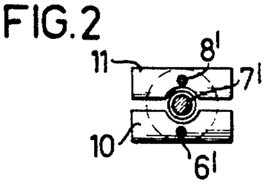
FIG. 2 is a cross section along the line 2—2 of FIG. 1.

Referring now to the drawing, in a mounting plate 1 of a record player a bearing member 2 is mounted for a swinging movement about a vertical axis 3. The tone arm 4 is rotatably mounted on the bearing part 2 about a horizontal axis 5. Three light guides 6, 7 and 8 are disposed adjacent to each other in the tone arm 4, which light guides 6, 7 and 8 are each bent downwardly at turning portions 24 continued through the bearing member 2 to below the mounting plate 1. The central light guide 7 serves as the light feed which light is fed from a light source 9 in its lower light guide part 7'. The two other light guide parts 6' and 8' return the light modulated by a tone frequency to light sensitive cells 10 and 11. The cells 10 and 11 are immovably arranged thereby and the light guide part 8' moves, for instance, with the swinging of the tone arm 4 at a low constant distance 12 over the surface 13 of the cell 11. An air gap 14 is provided separating the light guides in the tone arm from the light guide parts in the bearing member 2. The air gap is positioned near the horizontal rotary axis 5 of the tone arm 4, which air gap varies due to its position relative to the axis 5. In case of horizontal movements of the tone arm 4, the air gap practically does not vary at all, and the relative displacement of the light guide separating faces is practically without any significance.

The carrier 16 of the sensing or scanning needle 17 is maintained against rotation in any direction by means of a bearing 18 secured to a housing. A mirror 19 or the like is provided on the carrier 16. This mirror 19 reflects the light fed from the central light guide 7 to the light guides 6 and 8. The mirror has edges such that one edge 20 or 21 of the reflected light crosses the cross-sectional areas 22 and 23 of the light guides. The position of the two edges 20 and 21 is thereby chosen in coincidence with the two modulation directions of the record groove. If the scanning needle 17 moves in the direction of the edge 20, due to the corresponding movement of the mirror 19, the edge 21 of the reflected light moves cross-wise to the cross-sectional area 23 of the light guide 8 and the amount of the impinging light stream varies in the light guide 8. The varying light stream causes upon impinging upon the light sensitive cell 11 a corresponding current variation, which is transmitted to a conventional amplifier. The cell 10 which is coordinated to the light guide 6 remains without excitement due to the light stream remaining therein. Upon movement of the scanning needle 17 perpendicularly to the described direction, the occurrences in the two light guides 6 and 8 and in the cells 10 and 11, respectively, take place in corresponding reverse order.

While I have disclosed one embodiment of the present invention, it is to be understood that this embodiment is given by example only and not in a limiting sense, the scope of the present invention being determined by the objects and the claims.

I claim:

1. A light electric tone pickup comprising:
an immovably disposed holder,
a tone arm mounted at one end on said holder for a swinging movement about both a vertical and a horizontal axis,
a sensing needle mounted on the other end of said tone arm and adapted for sensing a tone modulated groove of a record,
a light source immovably disposed substantially adjacent said vertical axis of said tone arm,
a light beam control means operatively connected with said sensing needle,
at least one photoelectric means immovably mounted adjacent said vertical axis,
at least two light guides secured in said tone arm,
said light guides extending substantially horizontally in said tone arm and being bent at a turning portion and extending substantially along said vertical axis,
one end of one of said light guides being positioned to receive light from said light source,
one end of another of said light guides being positioned to direct a modulated light beam onto said photoelectric means, and
the other ends of said light guides being positioned to direct a light beam to said light beam control means for modulation thereby and to receive the modulated light beam therefrom, respectively.

2. The pickup, as set forth in claim 1, wherein:
said light source is mounted below said holder centrally with respect to said vertical axis,
said at least one photoelectric means comprises two photoelectric cells arranged about said light source,
said at least two light guides comprise three light guides, two of which are arranged for transmitting said modulated light beam from said control means to said two photoelectric cells, respectively,
said light guides are divided forming an air gap adjacent said turning portions, and
said air gap is adjacent said horizontal axis.

3. The pickup, as set forth in claim 1, wherein:
said light guides are divided forming an air gap adjacent said turning portions.

4. The pickup, as set forth in claim 3, wherein:
said air gap is adjacent said horizontal axis.

References Cited

UNITED STATES PATENTS

| | | | |
|---|---|---|---|
| 3,404,224 | 10/1968 | Revelo et al. | 178—6.7 X |
| 2,191,026 | 2/1940 | Olson | 179—100.41 |
| 2,410,104 | 10/1946 | Rainey. | |
| 3,235,672 | 2/1966 | Beguin | 179—100.41 X |
| 3,261,925 | 7/1966 | Smith | 179—100.41 |
| 3,325,603 | 6/1967 | Rabinow | 179—100.41 |

FOREIGN PATENTS

| | | |
|---|---|---|
| 313,904 | 6/1929 | Great Britain. |

JAMES W. MOFFITT, Primary Examiner

R. F. CARDILLO, Jr., Assistant Examiner

U.S. Cl. X.R.

179—100.3, 100.41